2,934,836
FUEL SUPPLY SIMULATOR FOR FLIGHT TRAINERS

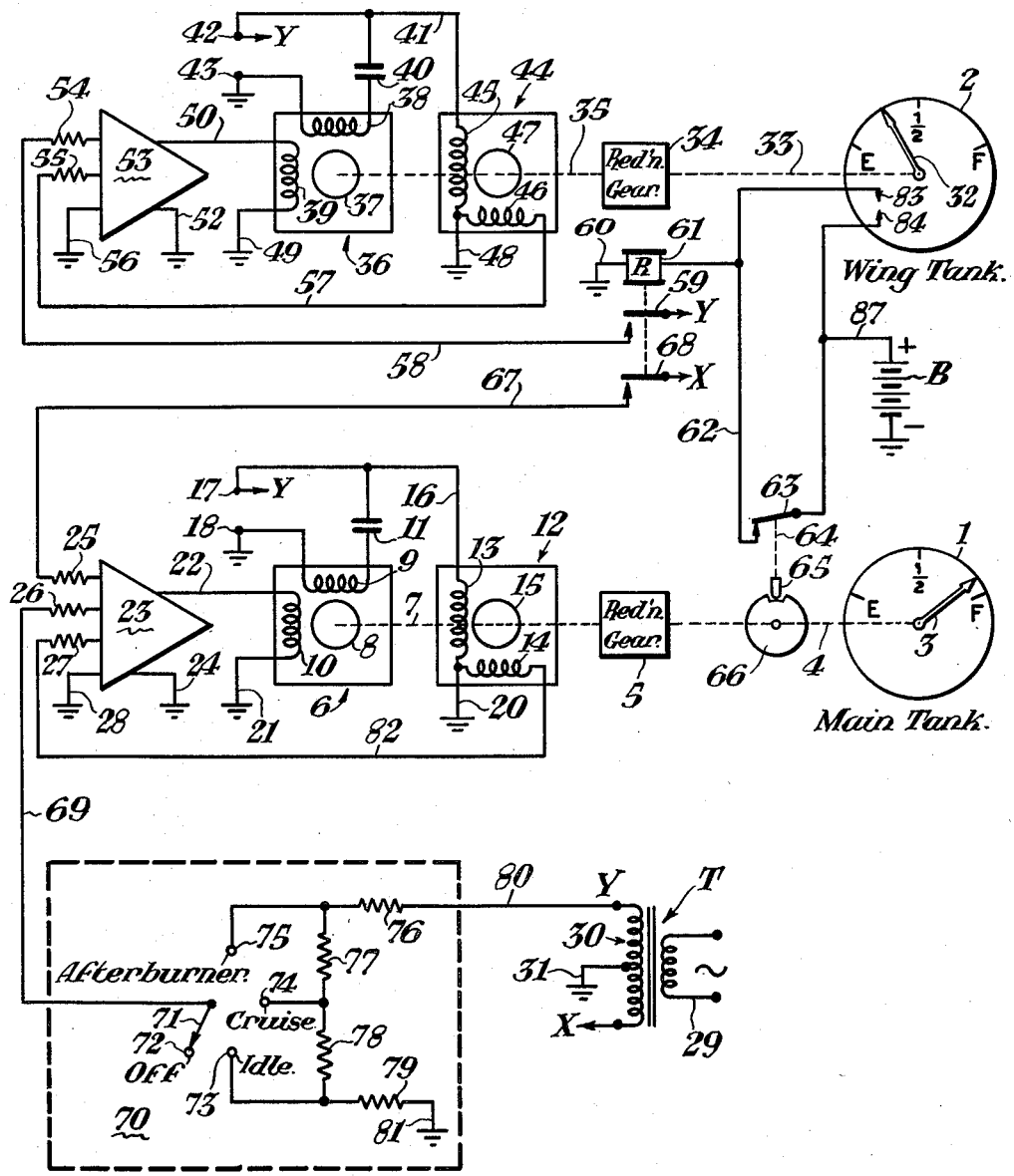

Robert P. Goldstein, Pittsburgh, Pa., and Robert I. Hildebrand, Baltimore, Md., assignors to Westinghouse Air Brake Company, Wilmerding, Pa., a corporation of Pennsylvania Application June 13, 1956, Serial No. 591,126

4 Claims. (Cl. 35—12)

This invention relates to flight trainers for aircraft pilots, and in particular to an improved fuel supply simulator therefor.

Conventional flight trainers are provided with cockpits representing as closely as possible the arrangement and appearance of those in operational aircraft. For example, replicas of the various condition indicating instruments normally found in the cockpit of an operational aircraft are usually provided. Among these are indicators showing the volume or mass of fuel in the various tanks distributed about the aircraft structure. It is known to provide these instruments with actuating devices which may represent varying degrees of tank fullness, as by the use of indicator lamps or potentiometers which may be positioned by the instructor. However, in actual aircraft operation the level of the various fuel indicators changes during flight, at rates dependent upon the power developed by the engine or engines, on the particular tanks which are connected to deliver fuel at a given time, and on the rate at which fuel is being pumped from one tank to another. Accordingly, it is an object of our invention to provide an improved simualtor for aircraft fuel supply indicators which will realistically indicate the rate at which fuel would be used during actual flight.

It is a further object of our invention to provide a fuel supply simulator which will simulate varying rates of fuel supply decrease in accordance with varying levels of engine operation.

It is a further object of our invention to provide a fuel supply simulator for aircraft flight trainers in which the simulation of pumping of fuel from one tank to another during engine operation is indicated by a decrease in the rate of fuel consumption from the tank into which fuel is being pumped.

It is a further object of our invention to provide an auxiliary fuel supply indicator and a main fuel supply indicator in combination with means for simultaneously decreasing the indication of the auxiliary fuel supply indicator and increasing the indication of the main fuel supply indicator at a selected rate simulating pumping from one tank to another.

Other objects and further advantages of our invention will be apparent to those skilled in the art as the description proceeds.

We shall first describe an embodiment of our invention, and shall then point out the novel features thereof in claims.

The drawing comprises a single figure showing a wiring diagram of one embodiment of our invention.

Referring to the drawing, the illustrated embodiment of our invention is adapted to be employed with a flight trainer having an instrument panel in which is mounted a main fuel supply indicator 1 and an auxiliary fuel supply indicator, here shown as a wing tank indicator 2. While only two such indicators have been shown, it will be apparent that the invention is applicable to a flight trainer having any desired number of fuel indicators.

Main tank indicator 1 includes a suitably graduated dial face on which an indicating needle 3 is pivotally mounted by suitable conventional means. Needle 3 is driven by a shaft 4 from a conventional reduction gear box 5. Reduction gear 5 is driven by a conventional servomotor 6 through shaft 7. Servomotor 6 may be of any suitable known type, but as here shown comprises a two phase alternating current induction motor, having a rotor 8, a first phase winding 9, a second phase winding 10, and a suitable phasing capacitor 11.

A conventional tachometer generator 12 is driven by motor 6 through shaft 7 for purposes to be described. This generator may comprise a first stator winding 13, a second stator winding 14 disposed at right angles to winding 13, and a conventional rotor 15. Winding 9 of motor 6 and winding 13 of generator 12 are continuously energized over a circuit including terminal Y of a power supply, to be described, terminal 17, lead 16, through winding 13 in parallel with winding 9 and condenser 11 to the grounded terminals 20 and 18 of the generator and motor, respectively, and thus to grounded terminal 31 of the power source.

Winding 10 of motor 6 has one terminal grounded at 21 and an opposite terminal connected over lead 22 to the output of a conventional servomotor amplifier 23 which has its second output terminal grounded at 24.

Amplifier 23 may be of a conventxional type well known in the art which produces an output in phase or 180° out of phase with the power source according as the input signal is in phase or out of phase with the power supply. The input signal to amplifier 23 is applied in parallel across summing resistors 25, 26 and 27, which would be connected to the control electrode of the first stage of amplifier 23, which stage is returned to ground at 28.

The power supply for the apparatus of Fig. 1 comprises a transformer T having a primary winding 29 connected to a suitable source of alternating voltage, not shown, and a secondary winding 30. Secondary winding 30 has a center tap 31, which is connected to ground as shown, and opposed terminals X and Y. It will be apparent that the voltage induced between terminal X and ground will be 180° out of phase with the voltage induced between terminal Y and ground, for purposes to be described. Since the sole purpose of this transformer is to supply suitable voltages of opposite phase, it will be apparent that any other power source suitable for supplying such voltages could be used.

Wing tank indicator 2 is provided with a suitably graduated dial face having pivotally mounted thereon an indicator needle 32. Needle 32 is mounted on shaft 33 for rotation thereby. Shaft 33 is driven by conventional reduction gear box 34. Reduction gear 34 is driven by motor 36 through a suitable shaft schematically indicated at 35. Motor 36 may be a conventional servomotor similar to motor 6, previously described, and as shown comprises a rotor 37, a first phase winding 38, having a phasing capacitor 40, and a second phase winding 39.

A conventional tachometer or rate generator 44, similar in all respects to generator 12, previously described, has a rotor 47 connected to be driven by shaft 35. Generator 44 also has stator windings 45 and 46 disposed at right angles to one another. Winding 45 of generator 44 has one terminal which is grounded at 48 and another terminal which is connected over lead 41 to terminal 42 which is connected to terminal Y of the previously described power source.

Winding 38 of motor 36 has one terminal which is grounded at 43 as shown, and another terminal which extends through capacitor 40 to lead 41 and terminal 42 which is connected to the power source as previously described. Winding 39 of motor 36 has one terminal grounded at 49, and another terminal connected over lead 50 to the output terminal of an amplifier 53 which corresponds in structure to amplifier 23, previously described. The second output terminal 52 of amplifier 53 is grounded as shown.

The input signal to amplifier 53 is supplied between grounded lead 56 and the input terminals of parallel summing resistors 54 and 55.

Amplifier 53 has a first control circut extending from its grounded terminal 56, through the input impedance of amplifier 53, through summing resistor 54, over lead 58, and over back contact 59 of a relay R to terminal Y of the power supply. A second control circuit for amplifier 53 extends from ground terminal 56, through the input impedance of amplifier 53, through summing resistor 55, and over lead 57 to one terminal of winding 46 of generator 44, which has its opposite terminal grounded at 48.

Amplifier 23 has a first control circuit which extends from grounded terminal 28, through the input impedance of amplifier 23, through summing resistor 25, over lead 67, and over back contact 68 of relay R to terminal X of the power supply. A second control circuit extends through resistor 27, over lead 82, and through winding 14 of generator 12 to ground at 20. A third control circuit for amplifier 23 extends through summing resistor 26, over lead 69, through a power demand simulator circuit 70 comprising switch 71 and resistors 77, 78 and 79, through resistor 76 and over lead 80 to terminal Y of the power supply.

The power demand simulator circuit 70 would in practice be quite complex since many power demand conditions must be simulated to properly represent practical operating conditions. However, since the details of this circuit form no part of the present invention, a simplified circuit has been shown to illustrate the principles involved. As shown this circuit comprises a voltage divider including resistors 76, 77, 78 and 79 connected in series between ground and lead 80, which is connected to terminal Y of the power supply as shown. Lead 69 is connected to switch 71, which has four positions simulating off, idle, cruise and afterburner operating conditions, respectively. It will be apparent that with switch 71 engaging off terminal 72, no voltage will be applied to lead 69, whereas as switch 71 is successively moved to engage terminals 73, 74 and 75, successive increments of voltage are applied to lead 69.

Relay R has an operating circuit which extends from ground at 60, through winding 61 of the relay, over lead 62, over back contact 63 of a switch, to be described, and over lead 87 to the positive terminal of a suitable battery B which has its negative terminal grounded as shown. Switch 63 is actuated by a suitable conventional means such as a rod schematically indicated at 64 having a cam follower 65 which is actuated by cam 66 mounted for rotation on shaft 4.

Cam 66 is positioned on shaft 4 with respect to indicating needle 3 such that when the indicator shows full, the small depressed portion of the cam is engaged by cam follower 65. In this position, switch 63 is closed as shown. However, when needle 3 moves away from the full position, follower 65 rides up on the raised portion of cam 66 and switch 63 is open, releasing relay R and engaging its back contacts 59 and 68. Contact 59 of relay R is connected to terminal Y of the power source, while contact 68 is connected to terminal X of the power source, for purposes to be described.

The operation of this embodiment of our invention will now be described. First, assume that the apparatus is in the condition shown, with the main tank indicator needle 3 indicating full and with cam follower 65 engaging the depression in cam 66 so that switch 63 is closed and relay R is energized over its previously described circuit. Contacts 59 and 68 of relay R are accordingly open as shown. If the power demand simulator circuit 70 is set in the position shown, with switch 71 engaging terminal 72, no power demand is simulated. Accordingly, motors 6 and 36 are at rest and amplifiers 23 and 53 are deenergized.

Next, assume that switch 71 is moved into engagement with terminal 73 to simulate an idling condition. A voltage is now applied to lead 69. This voltage is of a reference phase and in magnitude equals that fraction of the voltage between terminal Y and ground terminal 31 which is determined by the value of resistance 79 divided by the sum of the values of resistances 76, 77, 78 and 79. The voltage so applied to lead 69 is applied through summing resistor 26 to the input of amplifier 23 and produces a corresponding output across leads 22 and 24 of amplifier 23. The output voltage appearing across leads 22 and 24 is applied to winding 10 of motor 6, and rotor 8 accordingly begins to rotate in, say, a counterclockwise direction, dirving shaft 7, rotor 15 of generator 12, reduction gear 5, output shaft 4, cam 66 and needle 3.

As the rotor 15 of generator 12 begins to turn, a voltage is induced in winding 14. Winding 14 is wound in such a sense that the voltage appearing thereacross is 180° out of phase with the reference phase appearing between terminal Y and ground if the motor is rotated in a counterclockwise direction, and is in phase with the voltage appearing between terminal Y and ground if the generator is rotated in a clockwise direction. Accordingly, a voltage out of phase with the input voltage applied through resistor 26 is applied through summing resistor 27 to amplifier 23 and will be equal to the voltage applied through resistor 26 when motor 6 reaches a predetermined speed. Motor 6 will accordingly rotate at a speed substantially determined by the value of the voltage applied from power demand simulator 70.

As soon as shaft 4 has rotated needle 3 slightly away from the full indicating position, cam follower 65 will ride upon the raised portion of cam 66 and open switch 63. Relay R will therefore be released and its contacts 59 and 68 will be engaged. With contact 68 in its back position, voltage from supply terminal X, which is 180° out of phase with supply terminal Y, is applied over lead 67 through summing resistor 25 to amplifier 23. This voltage will oppose that introduced over lead 69 from power demand simulator 70. The power supply winding between terminal X and ground terminal 31 is so proportioned that the value of the voltage applied through summing resistor 25 will be substantially greater than that applied to the amplifier from lead 69 and circuit 70. Accordingly, amplifier 23 will produce an output reversed in phase from that previously described, and motor 6 will begin to rotate in the opposite direction, driving generator 12 clockwise and producing a reversed feed-back voltage across winding 14 of generator 12. Needle 3 will accordingly be driven back toward the full position at a relatively rapid rate, and when it reaches this position cam follower 65 will drop back into the depressed portion of cam 66, closing switch 63 and energizing relay R to open its contacts 59 and 68. As long as switch 71 remains in engagement with terminal 73 and auxiliary tank indicator 2 is beyond the empty position, this operation will be repeated, with the indicator of the main tank remaining near the full position to simulate refilling from the wing tank.

At the time that relay R was deenergized in the previously described cycle of operation, closing of its back contact 59 completed a circuit from terminal Y, over lead 58, and through summing resistor 54 to the input of amplifier 53. Amplifier 53 accordingly will produce an output between lead 50 and ground. Motor 36 will run in a counterclockwise direction under these circumstances. Rotor 47 of generator 44, reduction gear 34, shaft 33, and needle 32 of wing tank indicator 2 will accordingly be driven in a counterclockwise direction simulating a decrease in the contents of the wing tank at a rate equal to the corresponding increase in the indication of the main tank indicator 1. Of course, the net rate of rotation of needle 3 will be proportional to the rate of decrease of the wing tank indication minus the component of the rate of decrease of the main tank in response to the signal from demand simulator 70. Generator 44 operates as described above in connection with generator 12 to provide a feed-back signal across its winding 46 which is applied to amplifier 53 through lead 57 and summing resistor 55 in a direction to oppose the input voltage and stabilize the motor speed at a value corresponding to the magnitude of the input signal.

Next, assume that switch 71 of power demand simulator 70 is moved into engagement with cruise terminal 74, to simulate a cruising power demand condition. An increased voltage, in phase with that between terminal Y and ground, is therefore applied over lead 69 and through summing resistor 26 to amplifier 23. As previously described, motor 6 will begin to operate in a counterclockwise direction, but will be stabilized by the feed-back action of generator 12 at a higher speed due to the increased value of the voltage which must be supplied from winding 14 of generator 12 to equal that applied through lead 69 and summing resistor 26. As needle 3 moves away from the full position, follower 65 will ride upon cam 66, opening switch 63 and deenergizing relay R as previously described. In this case, the opposing voltage applied over contact 68 of relay R, lead 67, and through summing resistor 25, will be only slightly greater than that applied from power demand simulator circuit 70, so that needle 3 will rotate toward the full position at a slower rate. During this time, closing of back contact 59 of relay R will reenergize amplifier 53 and motor 36 will again rotate to move needle 32 of wing tank indicator 2 toward the empty position. It will be noted that the wing tank depletion rate is the same as that previously simulated, although the main tank increase rate is lower, since a greater power demand has been simulated. This accurately represents conditions as they would occur in an actual aircraft.

Next, assume that switch 71 is moved into engagement with terminal 75 to simulate afterburner operation, corresponding to the maximum fuel demand. The maximum voltage will now be applied over lead 69 and through summing resistor 26 to amplifier 23, and motor 6 will rotate at a relatively high rate, until the feed-back voltage from generator 12 substantially equals the applied voltage. Relay R will be deenergized by the action of cam 66 in its associated switch 63 as previously described. In this instance, the voltage applied over contact 68 of relay R will be insufficient to equal that applied from circuit 70, and accordingly motor 6 will continue to rotate in a counterclockwise direction at a slow rate. This rate will continue during the afterburner simulating operation. At the same time, the voltage applied over contact 59 of relay R to amplifier 53 will cause motor 36 to rotate at its predetermined rate to show a decrease in the contents of the wing tanks.

While, for simplicity, only those elements have been shown which are necessary in order to illustrate our invention, it will be obvious that various additional features could be provided within the scope of the invention. For example, if it were desired to extend the simulation to illustrate the condition of empty tanks, suitable switches could be provided for operation by needles 3 and 32 of the tank indicators to disconnect their respective operating circuits when the indicators were driven to an empty tank position. This condition is provided for in the embodiment shown by provision of contacts 83 and 84 which are connected across leads 62 and 87 as shown, shunting switch 63. These contacts are normally spaced apart as shown, but are driven into engagement by needle 32 when the indicator falls to the empty position. In this condition, relay R will be energized regardless of the operation of cam 66 and switch 63 and accordingly no refilling of the main tank will be stimulated since the wing tank is assumed to be empty at this time. Of course, in a more complex circuit involving the simulation of an aircraft having a plurality of tanks, additional switches of this type could be provided to connect in additional tanks or disconnect other tanks as conditions require.

While we have described only one embodiment of our invention in detail, it will be apparent to those skilled in the art that many changes and modifications could be made within the scope of the invention. Accordingly, we do not wish to be limited to the details shown, but only by the scope of the following claims.

Having thus described our invention, what we claim is:

1. In a fuel supply simulator, in combination, a first servomotor having a first shaft output simulating the supply of fuel in a first tank, a second servomotor having a second shaft output simulating the supply of fuel in a second tank, reversible first control means for said first servomotor, second control means for said second servomotor, means producing a signal simulating fuel consumption for actuating said first control means in a sense to decrease said shaft output, means responsive to decrease in said first shaft output for producing a pair of signals of opposite sense, means for applying one of said signals to said first control means in a sense to increase said first shaft output, and means for applying the other of said pair of signals to said second control means in a sense to decrease said second shaft output.

2. In a fuel supply simulator, in combination, an auxiliary tank contents indicator, first motor means connected to position said indicator, first balanceable control means connected to said motor means for operation thereof in response to the character of an applied signal, a main tank contents indicator, second motor means connected to positon said main tank indicator between an empty and a full position, second balanceable control means connected to said second motor means for reversible operation thereof in response to the character of an applied signal, relay means, means controlled by said relay means for applying a signal of a first character to said first balanceable control means and a signal of an opposite character to said second balanceable control means, first and second means responsive to the speed and direction of operation of said first and second motor means, respectively, to apply signals to said first and second balanceable control means, respectively, of a character to oppose the direction of motor operation, means responsive to positioning of said main tank indicator away from said full position to actuate said relay means, and means for applying a variable signal of said first character to said second balanceable control means to simulate a variable fuel demand.

3. In a fuel supply simulator in combination, reversible first motor means, control means including a balanceable network for operating said motor means in a first or an opposite sense in accordance with the algebraic sum of signals applied to said network, adjustable means having a plurality of positions for applying a first signal of a magnitude selected from a predetermined plurality of magntiudes to said network for operating said motor in said first sense, means responsive to the speed and sense of operation of said motor means for applying a second signal to said network to oppose the sense of operation of said motor means, relay means, means responsive to a predetermined movement of said motor means away from a given position for actuating said relay means, circuit means controlled by said relay means for applying a signal to said network opposite to said first signal and having a magnitude intermediate the extremes of said plurality of magnitudes, second motor means, control means including a second balanceable network for operating said second motor means in said opposite sense in accordance with the algebraic sum of signals applied to said network, second circuit means controlled by said relay means for applying a signal to said second network to operate said second motor means in said opposite sense, and means responsive to the speed and sense of operation of said second motor means for applying a signal to said second network to oppose the sense of operation of said second motor means.

4. A fuel supply simulator, comprising, in combination, a first tank contents indicator, first servomotor means responsive to the phase and magnitude of applied signals for positioning said indicator in a direction determined by the phase of said signals and at a rate determined by the algebraic sum of the magnitudes of said signals, said indicator being adjustable over a range between an empty and a full position, means for applying a signal to said servomotor means of a phase to position said indicator toward its empty position and of a magnitude selected from a first, a second and a third magnitude, representing idling, cruising and afterburner conditions of operation, respectively, means responsive to movement of said indicator away from its full position for applying a signal to said servomotor means of a phase to position said indicator toward its full position and of a magnitude between said second and said third magnitudes, an auxiliary indicator, servo means for positioning said auxiliary indicator at a rate depending upon the magnitude of applied signals and in a direction determined by the phase of signals applied thereto, and means actuated by said means responsive to movement of said first indicator away from its full position for applying a signal to said second servomotor means of a phase to position said second indicator towards its empty position.

References Cited in the file of this patent

UNITED STATES PATENTS

| | | |
|---|---|---|
| 2,218,546 | Muller | Oct. 22, 1940 |
| 2,491,668 | Koechling | Dec. 20, 1949 |